United States Patent
Iuchi et al.

(10) Patent No.: US 9,411,330 B2
(45) Date of Patent: Aug. 9, 2016

(54) NUMERICAL CONTROL DEVICE

(75) Inventors: Yukihiro Iuchi, Chiyoda-ku (JP);
Daisuke Fujino, Chiyoda-ku (JP);
Naoki Nakamura, Chiyoda-ku (JP);
Tomonori Sato, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 497 days.

(21) Appl. No.: 13/992,107

(22) PCT Filed: Jan. 26, 2011

(86) PCT No.: PCT/JP2011/051521
§ 371 (c)(1),
(2), (4) Date: Jun. 6, 2013

(87) PCT Pub. No.: WO2012/101789
PCT Pub. Date: Aug. 2, 2012

(65) Prior Publication Data
US 2013/0253695 A1    Sep. 26, 2013

(51) Int. Cl.
*G05B 19/402* (2006.01)
*G05B 19/4068* (2006.01)

(52) U.S. Cl.
CPC .......... *G05B 19/402* (2013.01); *G05B 19/4068* (2013.01); *G05B 2219/49157* (2013.01)

(58) Field of Classification Search
None
See application file for complete search history.

(56) References Cited

U.S. PATENT DOCUMENTS

| | | |
|---|---|---|
| 2005/0090930 A1 | 4/2005 | Otsuki et al. |
| 2005/0107000 A1 | 5/2005 | Otsuki et al. |
| 2006/0177281 A1 | 8/2006 | Glaesser |

FOREIGN PATENT DOCUMENTS

| | | |
|---|---|---|
| DE | 103 30 831 A1 | 2/2005 |
| JP | 63-074548 A | 4/1988 |
| JP | 63-174844 A | 7/1988 |
| JP | 05-345291 A | 12/1993 |
| JP | 08-115114 A | 5/1996 |
| JP | 2003-280708 A | 10/2003 |
| JP | 2005-128686 A | 5/2005 |

OTHER PUBLICATIONS

German Office Action, mailed Apr. 8, 2014, Application No. 1120111047843.

*Primary Examiner* — Sean Shechtman
*Assistant Examiner* — Geoffrey Wellman
(74) *Attorney, Agent, or Firm* — Sughrue Mion, PLLC (57) ABSTRACT

A numerical control device for a working machine capable of controlling a tool posture relative to a workpiece using rotational driving of a rotary drive axis about a machine control point includes: an interpolation unit that performs an interpolation process on moving data generated from a machining program and outputs a position of the machine control point for each interpolation point; a coordinate transformation unit that transforms a position of the machine control point to a tool tip-point position; a stroke-limit determination unit that determines whether the position of the machine control point and the tool tip-point position fall within a range of a movable region, and selects and outputs a stroke limit signal indicating a stroke limit and a tool-posture changing command for instructing change of the tool posture; and a tool-posture changing unit that changes the tool posture in response to the tool-posture changing command.

10 Claims, 8 Drawing Sheets

NUMERICAL CONTROL DEVICE

CROSS REFERENCE TO RELATED APPLICATIONS

This application is a National Stage of International Application No. PCT/JP2011/051521 filed Jan. 26, 2011, the contents of all of which are incorporated herein by reference in their entirety.

FIELD

The present invention relates to a numerical control device that executes numerical control (NC) over a machine tool, and more particularly to a numerical control device for a multi-axis machine tool capable of controlling the position and the posture of a tool by driving a rotary drive axis to rotate.

BACKGROUND

A machine tool in which a numerical control device is mounted performs machining by controlling each axis so that a tool moves to an instructed position and moving a movable unit. The numerical control device controls a movable range of the tool by setting a movable region, thereby avoiding interference between the tool and a working machine. A working machine provided with a rotary drive axis performs machining by adjusting the position and posture of the tool with driving the rotary drive axis to rotate. Conventionally, many measures have been taken on the numerical control device to narrow the movable region in view of the rotational angle of the rotary drive axis so as to avoid a tool tip from being brought into contact with the working machine.

Furthermore, there has been conventionally proposed a method of avoiding the interference with not narrowing a range of the movable region as much as possible by obtaining a position of a tool tip point from the length between a machine control point and the tool tip and a rotational angle of the tool and determining whether or not the tool falls within the range of the movable region (see, for example, Patent Literature 1).

CITATION LIST

Patent Literature

Patent Literature 1: Japanese Patent Application Laid-open No. 2003-280708

SUMMARY

Technical Problem

In a case of actuating the rotary drive axis such as a case of controlling the tool tip point, the tool is often tilted. Accordingly, it is often the case that the tool is possibly out of the range of the movable region. Thus, the conventional numerical control device has problems that it is difficult to make full use of the movable range of the working machine and that work efficiency declines due to a correction operation for avoiding a stroke limit.

The present invention has been achieved in view of the above-mentioned circumstances, and an object of the present invention is to provide a numerical control device capable of making full use of a movable range of a working machine and improving work efficiency.

Solution to Problem

In order to solve the above-mentioned problems and achieve the object, the present invention provides a numerical control device for a working machine capable of controlling a tool posture relative to a workpiece using rotational driving of a rotary drive axis about a machine control point, the numerical control device comprising: an interpolation unit that performs an interpolation process on moving data generated from a machining program, and outputs a position of the machine control point for each interpolation point; a coordinate transformation unit that transforms a position of the machine control point to a tool tip-point position; a stroke-limit determination unit that determines whether or not the position of the machine control point and the tool tip-point position fall within a range of a movable region, and selects and outputs a stroke limit signal indicating a stroke limit and a tool-posture changing command for instructing change of the tool posture; and a tool-posture changing unit that changes the tool posture in response to the tool-posture changing command.

Advantageous Effects of Invention

The numerical control device according to the present invention can make full use of a movable range of a working machine and improve work efficiency.

DESCRIPTION OF EMBODIMENTS

Embodiment of a numerical control device according to the present invention will be explained below in detail with ref-

Embodiment

Figure 1:
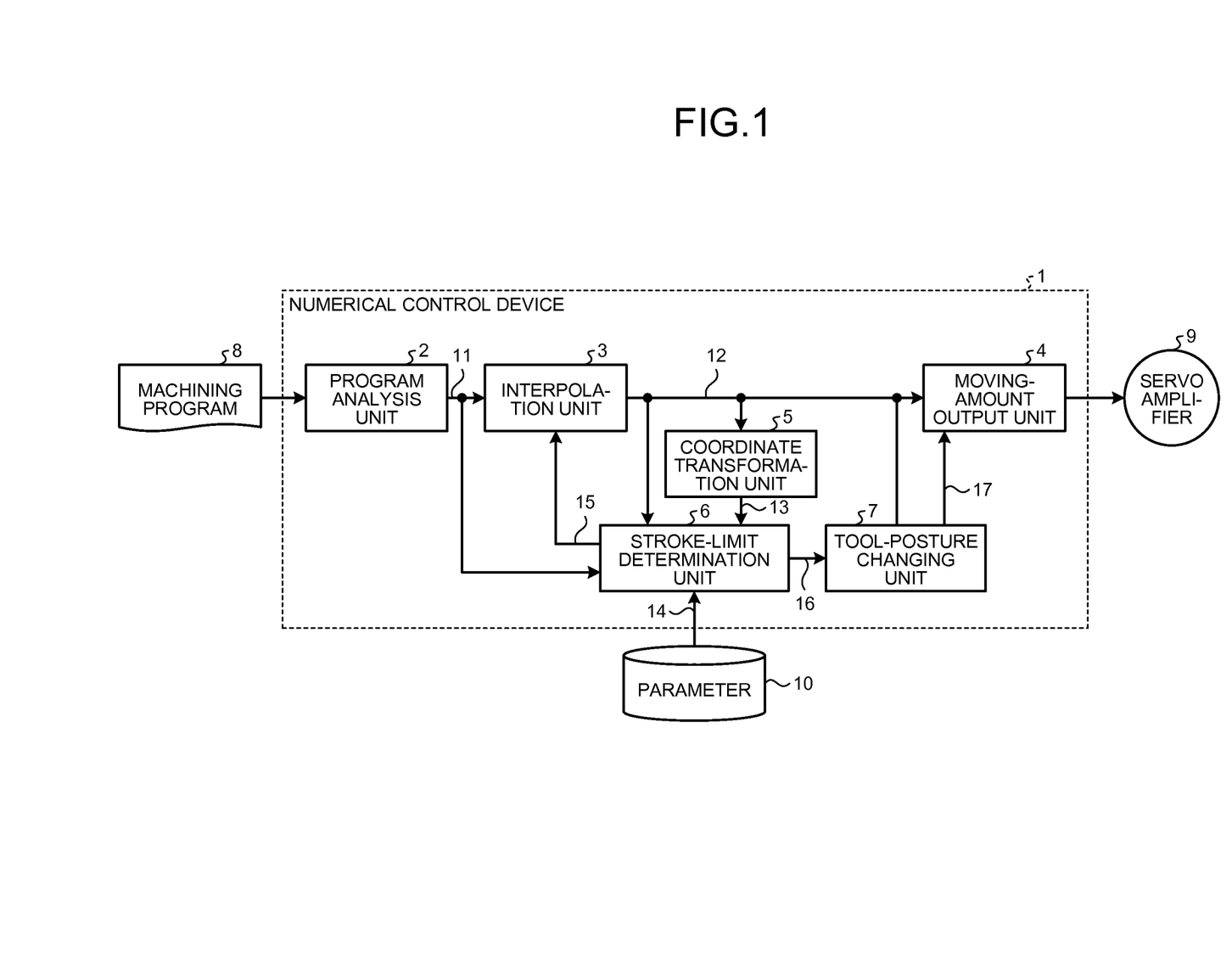
FIG. 1 is a block diagram showing a configuration of a numerical control device according to an embodiment of the present invention.

FIG. 1 is a block diagram showing a configuration of a numerical control device according to an embodiment of the present invention. A numerical control device 1 reads a machining program 8, performs an analysis process and an interpolation process, and outputs a position command to a servo amplifier 9. A working machine controlled by the numerical control device 1 controls a tool posture relative to a workpiece through use of rotational driving of a rotary drive axis about a machine control point.

The numerical control device 1 includes a program analysis unit 2, an interpolation unit 3, a moving-amount output unit 4, a coordinate transformation unit 5, a stroke-limit determination unit 6, and a tool-posture changing unit 7. The program analysis unit 2 reads the machining program 8 and generates moving data 11. The moving data 11 are movement-related information, for example, information about a moving mode indicating a distinction among positioning and cutting feed and the the like, a control mode indicating whether a tool tip-point position control or the like is valid or invalid, and a moving position that is a starting position or an end position of a block. The tool tip-point position control refers to a control executed in a case where the moving data 11 serve as a command to indicate a tool tip-point position 13. In contrast, a control executed in a case where the moving data 11 serve as a command to indicate a machine control-point position (hereinafter, called "machine position" as appropriate) 12 is referred to as "machine position control".

The interpolation unit 3 performs an interpolation process on the moving data 11 generated by the program analysis unit 2 and outputs the machine position 12 for each interpolation point. In a case of a tool tip-point position control, the interpolation unit 3 obtains the tool tip-point position 13 for each interpolation point by performing the interpolation process, and obtains the machine position 12 by coordinate transformation based on the tool tip-point position 13, a rotational angle of a rotary drive axis, and a length from a machine control point to a tool tip point. The transformation from the tool tip-point position 13 to the machine position 12 is referred to as "reverse transformation". Transformation from the machine position 12 to the tool tip-point position 13 is referred to as "forward transformation". The moving-amount output unit 4 obtains a position command from the machine position 12 outputted by the interpolation unit 3, and outputs the position command to the servo amplifier 9.

The coordinate transformation unit 5 obtains the tool tip-point position 13 by the forward transformation from the machine position 12. The stroke-limit determination unit 6 determines whether the machine position 12 and the tool tip-point position 13 fall within the range of a movable region 14. The movable region 14 is stored in advance as a parameter 10.

The stroke-limit determination unit 6 also determines whether the control mode indicates the machine position control or the tool tip-point position control from the moving data 11. When the machine position 12 is out of the range of the movable region 14 in the machine position control, and when the tool tip-point position 13 is out of the range of the movable region 14 in the tool tip-point position control, the stroke-limit determination unit 6 outputs a stroke limit signal 15 indicating that it is a stroke limit to the interpolation unit 3.

When the tool tip-point position 13 is out of the range of the movable region 14 in the machine position control, and when the machine position 12 is out of the range of the movable region 14 in the tool tip-point position control, the stroke-limit determination unit 6 outputs a tool-posture changing command 16 for instructing change of a tool posture 17. The stroke-limit determination unit 6 selects and outputs the stroke limit signal 15 and the tool-posture changing command 16 depending on a result of determination as to whether the machine position 12 and the tool tip-point position 13 fall within the range of the movable region 14.

The tool-posture changing unit 7 changes the tool posture 17 in response to the tool-posture changing command 16. The tool-posture changing unit 7 obtains the tool posture 17 and the machine position 12 in which the machine position 12 and the tool tip-point position 13 fall within the range of the movable region 14, and outputs the tool posture 17 and the machine position 12. The tool posture 17 is a tilt of the tool with a workpiece serving as a reference and is made able to be changed by rotation of the rotary drive axis.

While the configuration of the numerical control device 1 shown in FIG. 1 is shown as an example where an automatic operation is implemented, the invention is not limited by this example. The numerical control device 1 may be directed to implementation of a manual operation. Even in a case of a manual operation, the interpolation unit 3 of the numerical control device 1 generates the machine position 12 for each interpolation point based on the moving data 11 such as the control mode or the command relating to the rotation and movement of the rotary drive axis. Even in a manual operation, the numerical control device 1 can determine whether the machine position 12 and the tool tip-point position 13 fall within the range of the movable region 14 and/or change the tool posture 17 similarly to the automatic operation.

Figure 2:
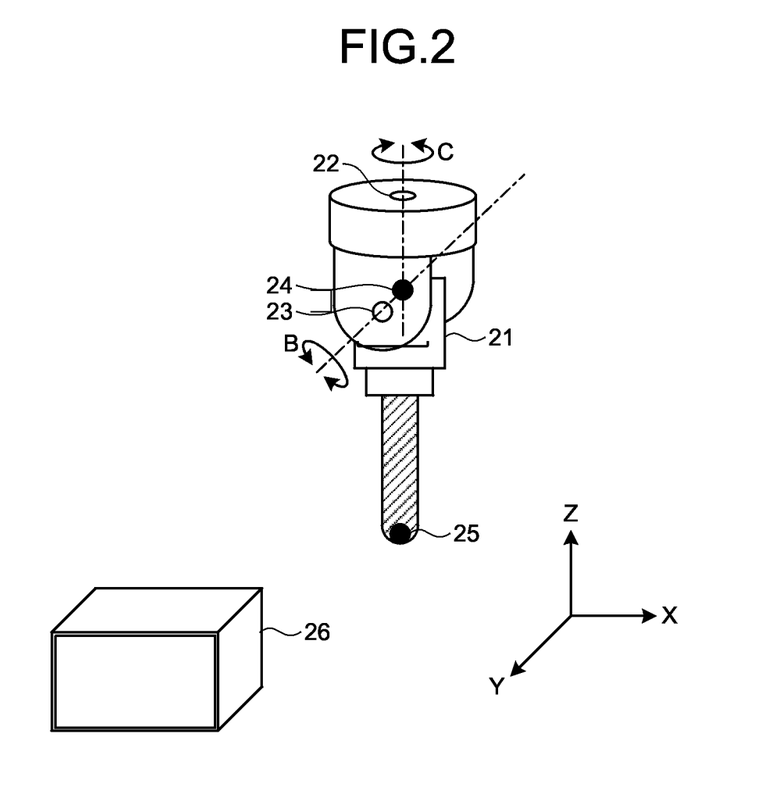
FIG. 2 is a schematic illustration showing a mechanical configuration of a working machine controlled by a numerical control device.

FIG. 2 is a schematic illustration showing a mechanical configuration of a working machine controlled by the numerical control device. The working machine exemplarily shown herein is a so-called tool-tilting five-axis processing machine having not only three translation axes (X-axis, Y-axis and Z-axis) perpendicular to one another but also two rotational axes (B-axis and C-axis) on a tool 21 side. In this example, a tool-side first rotation drive axis 22 corresponds to the C-axis rotating about the Z-axis. A tool-side second rotary drive axis 23 corresponds to the B-axis rotating about the Y-axis. A machine control point 24 is a control point in the case of the machine position control and corresponds to an intersection point between the B-axis and the C-axis. A tool tip point 25 is a control point in the case of the tool tip-point position control and located on a tip of the tool 21.

The working machine can adjust the tilt of the tool 21 relative to a workpiece 26 by rotating the tool-side first rotary drive axis 22 and the tool-side second rotary drive axis 23. A position of the tool tip point 25 moves according to a rotational angle of the tool-side first rotary drive axis 22 and a rotational angle of the tool-side second rotary drive axis 23. It is noted that an arbitrary configuration may be adopted for the working machine as long as the working machine can adjust the tool posture using the rotational driving of the rotary drive axes.

Figure 3:
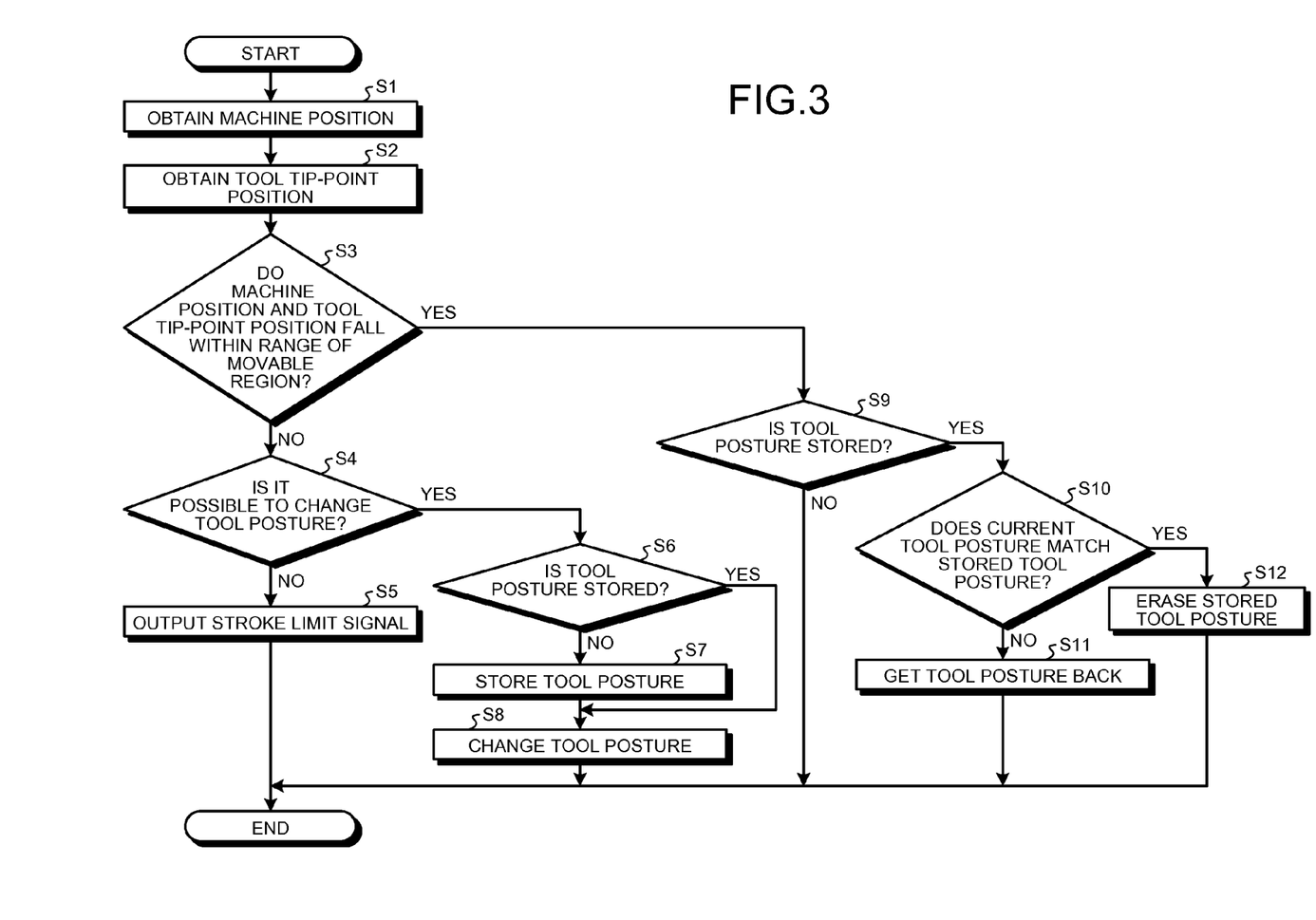
FIG. 3 is a flowchart showing a process procedure for a control executed by a numerical control device.

FIG. 3 is a flowchart showing a process procedure for the control executed by the numerical control device.

The interpolation unit 3 obtains a position (machine position 12) of the machine control point 24 for each interpolation point (Step S1). In the case of the tool tip-point position control, the interpolation unit 3 obtains the tool tip-point position 13 for each interpolation point by performing the interpolation process, and obtains the machine position 12 by reverse transformation of the tool tip-point position 13 using the rotational angles of the tool-side first rotary drive axis 22 and the tool-side second rotary drive axis 23 and a length from the machine control point 24 to the tool tip point 25.

The coordinate transformation unit 5 obtains the tool tip-point position 13 by forward transformation of the machine position 12 obtained at Step S1 (Step S2). The stroke-limit determination unit 6 determines whether the machine position 12 obtained at Step S1 and the tool tip-point position 13 obtained at Step S2 fall within the range of the movable region 14 (Step S3).

When at least one of the machine position 12 and the tool tip-point position 13 is out of the range of the movable region 14 (NO at Step S3), the stroke-limit determination unit 6 determines whether or not the tool posture 17 can be changed (Step S4). When determining that the tool posture 17 can not be changed (NO at Step S4), the stroke-limit determination unit 6 outputs the stroke limit signal 15 (Step S5). When the stroke limit signal 15 is inputted to the interpolation unit 3 from the stroke-limit determination unit 6, the numerical control device 1 ends the process for avoiding the stroke limit. When determining the tool posture 17 can be changed (YES at Step S4), the numerical control device 1 proceeds with the process to Step S6.

Figure 4:
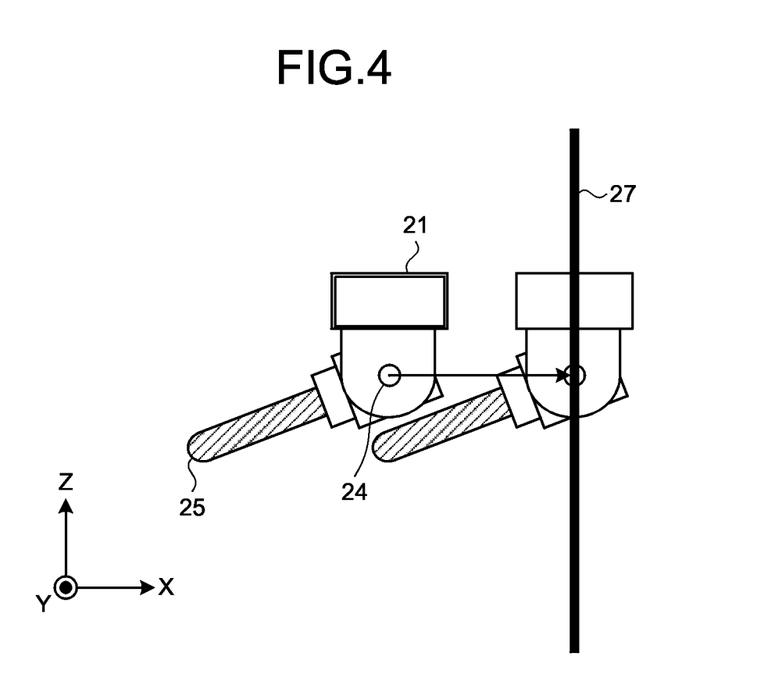
FIG. 4 is an explanatory diagram of an example of determining that it is impossible to change a tool posture under a machine position control.
Figure 5:
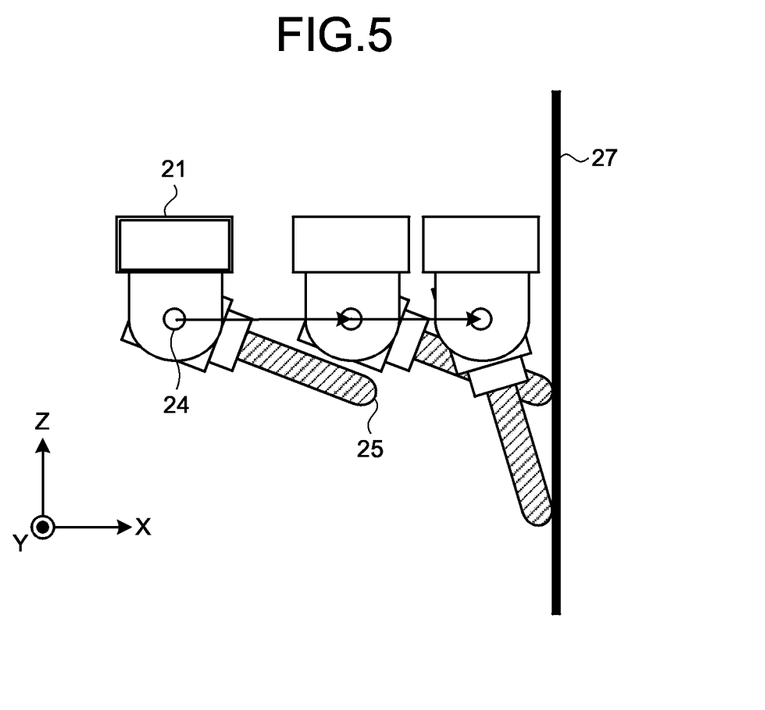
FIG. 5 is an explanatory diagram of an example of determining that it is possible to change a tool posture under a machine position control.

Determination as to whether or not the tool posture 17 can be changed is now explained. FIG. 4 is an explanatory diagram of an example of determining that the tool posture can not be changed under the machine position control. FIG. 5 is an explanatory diagram of an example of determining that it is possible to change the tool posture under the machine position control. Herein, there is exemplified a case of determining whether the stroke limit can be avoided by change of the tool posture 17 to rotate the tool-side second rotary drive axis 23. Furthermore, graphic illustration of configurations unnecessary for the explanations are omitted as appropriate.

In the tool posture 17 shown in FIG. 4, the tool tip point 25 is located on the opposite side to a limit 27 of the movable region 14 as seen from the machine control point 24. Now it is considered that a position command is issued to indicate that the machine control point 24 should surpass the limit 27 in such a tool posture 17. A control point that is out of the range of the movable region 14 is the machine control point 24 that is the same as an object of the position command. Because the stroke limit can not be avoided by change of the tool posture 17 to rotate the tool-side second rotary drive axis 23, the stroke-limit determination unit 6 determines that it is impossible to change the tool posture 17.

In the tool posture 17 shown in FIG. 5, the tool tip point 25 is located on a side of the limit 27 as viewed from the machine control point 24. Now it is considered that a position command is issued to indicate that the tool tip point 25 should surpass the limit 27 in such a tool posture 17. A control point that is out of the range of the movable region 14 is the tool tip point 25 different from an object of the position command. Because the stroke limit can be avoided by change of the tool posture 17 to rotate the tool-side second rotary drive axis 23, the stroke-limit determination unit 6 determines that it is possible to change the tool posture 17.

Figure 6:
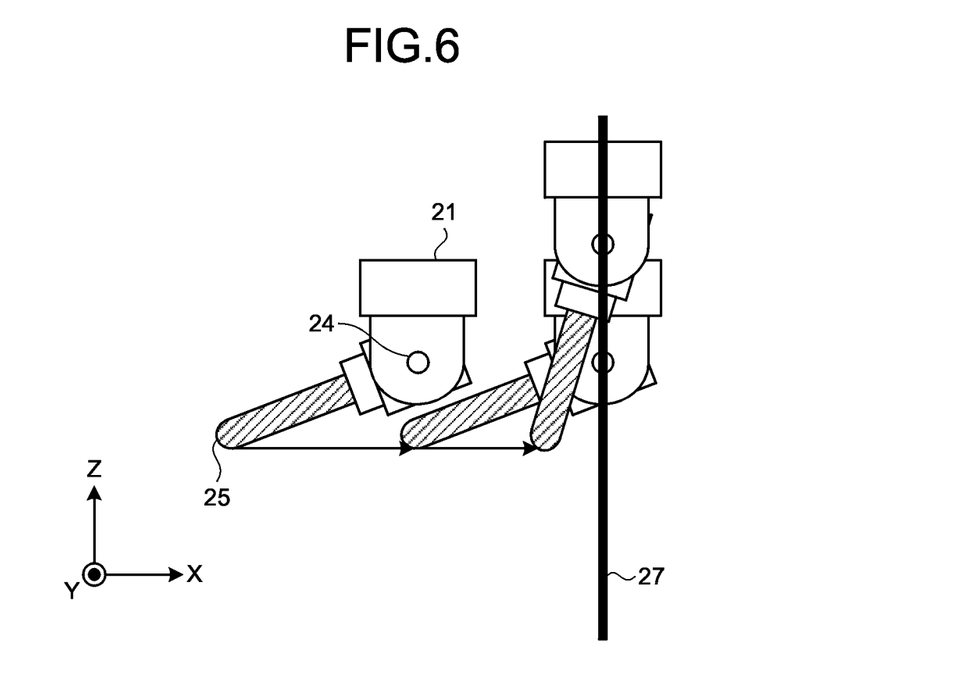
FIG. 6 is an explanatory diagram of an example of determining that it is possible to change a tool posture under a tool tip-point position control.
Figure 7:
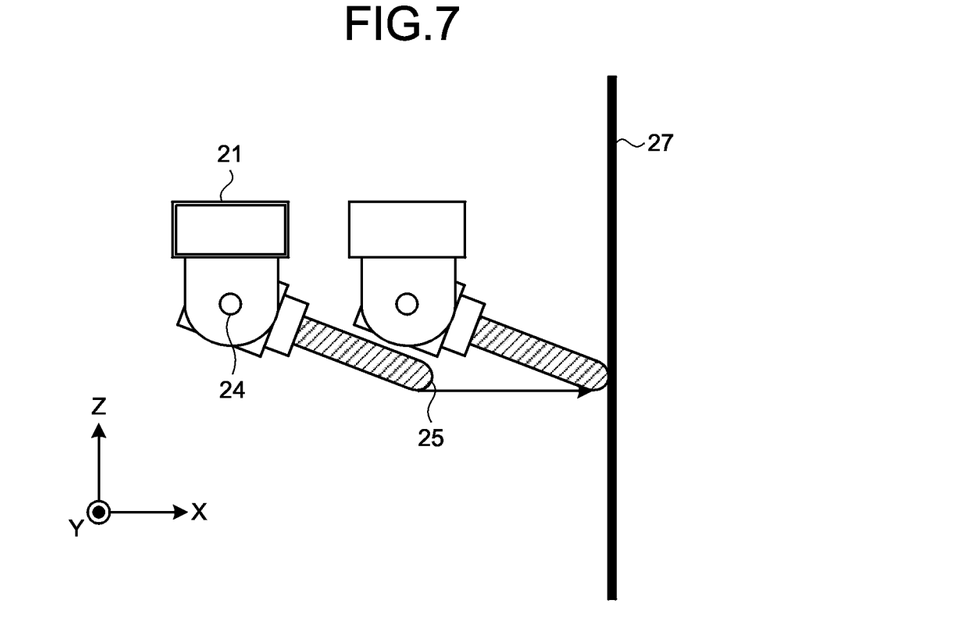
FIG. 7 is an explanatory diagram of an example of determining that it is impossible to change a tool posture under a tool tip-point position control.

FIG. 6 is an explanatory diagram of an example of determining that it is possible to change the tool posture under the tool tip-point position control. FIG. 7 is an explanatory diagram of an example of determining that it is impossible to change the tool posture under the tool tip-point position control. Also herein, there is exemplified a case of determining whether or not the stroke limit can be avoided by change of the tool posture 17 to rotate the tool-side second rotary drive axis 23. Furthermore, graphic illustration of configurations unnecessary for the explanations are omitted as appropriate again.

In the tool posture 17 shown in FIG. 6, the machine control point 24 is located on the side of the limit 27 as viewed from the tool tip point 25. Now it is assumed that a position command is issued to indicate that the machine control point 24 should surpass the limit 27 in such a tool posture 17. A control point that is out of the range of the movable region 14 is the machine control point 24 different from an object of the position command. Because the stroke limit can be avoided by change of the tool posture 17 to rotate the tool-side second rotary drive axis 23, the stroke-limit determination unit 6 determines that it is possible to change the tool posture 17.

In the tool posture 17 shown in FIG. 7, the machine control point 24 is located on the opposite side to the limit 27 as viewed from the tool tip point 25. Now it is assumed that a position command is issued to indicate that the tool tip point 25 should surpass the limit 27 in such a tool posture 17. A control point that is out of the range of the movable region 14 is the tool tip point 25 that is the same as an object of the position command. Because the stroke limit can not be avoided by change of the tool posture 17 to rotate the tool-side second rotary drive axis 23, the stroke-limit determination unit 6 determines that it is impossible to change the tool posture 17.

As described with reference to FIGS. 4 to 7, the stroke-limit determination unit 6 determines that it is impossible to change the tool posture 17 when the control point that is out of the range of the movable region 14 in response to the position command and the control point that is an object of the position command match each other in either the machine control point 24 or the tool tip point 25. Furthermore, the stroke-limit determination unit 6 determines that it is possible to change the tool posture 17 when the control point that is out of the range of the movable region 14 in response to the position command and the control point that is an object of the position command do not match each other. The numerical control device 1 can thereby perform an operation for avoiding the stroke limit upon confirming that the tool posture 17 can be changed.

Referring back to FIG. 3, the tool-posture changing unit 7 determines whether or not the tool posture 17 is stored therein (Step S6). When the tool posture 17 is not stored in the tool-posture changing unit 7 (NO at Step S6), the tool-posture changing unit 7 stores the tool posture 17 therein (Step S7). After storing the tool posture 17 or if the tool posture 17 has been stored (YES at Step S6), the numerical control device 1 causes the tool-posture changing unit 7 to change the tool posture 17 (Step S8) and ends the process.

A method of changing the tool posture 17 by the tool-posture changing unit 7 is explained next. The tool-posture changing unit 7 changes the tool posture 17 in parallel to causing the control point to operate as indicated. When a command is issued for the machine control point 24 and the tool tip point 25 is out of the range of the movable region 14, the numerical control device 1 changes the tool posture 17 while controlling the machine control point 24 to operate as indicated. When a command is issued for the tool tip point 25 and the machine control point 24 is out of the range of the movable region 14, the numerical control device 1 changes the tool posture 17 while controlling the tool tip point 25 to operate as indicated.

Figure 8:
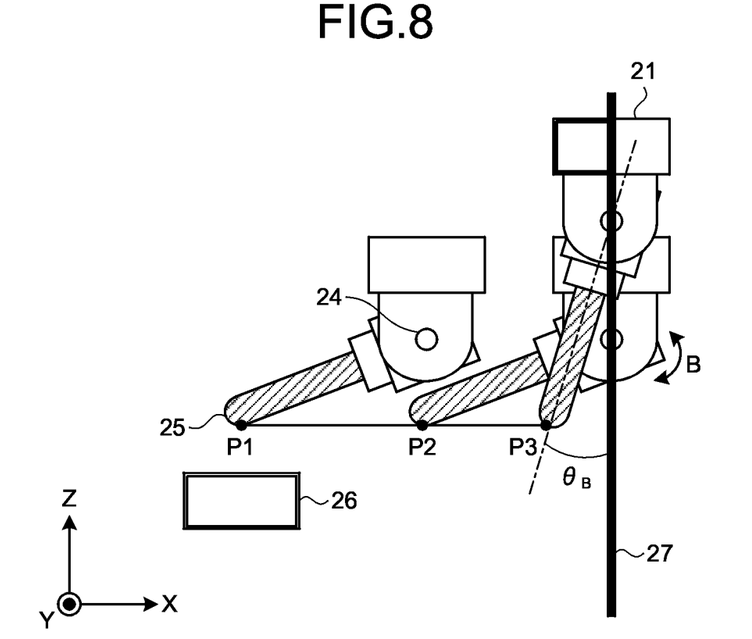
FIG. 8 is an explanatory diagram of an example of an operation for changing a tool posture on an X-Z plane.

FIG. 8 is an explanatory diagram of an example of an operation for changing the tool posture on in X-Z plane. Herein, there is exemplified a case of the tool tip-point position control for changing the position of the tool tip point 25 to P1, P2 and P3 in this order. When the tool tip point 25 is at P2, the machine control point 24 is out of the range of the movable region 14 on the X-axis. In an interval from P1 to P2, the numerical control device 1 moves the tool tip point 25 without changing the tool posture 17. In an interval from P2 to P3, the numerical control device 1 moves the tool tip point 25 while changing the tool posture 17 by driving the tool-side second rotary drive axis 23 (the B-axis) to rotate.

The tool-posture changing unit 7 obtains a rotational angle of the B-axis in the interval from P2 to P3 by the following calculation, for example. Where a position of the machine control point 24 is denoted by $(X_M, Y_M, Z_M)$, a position of the tool tip point 25 is denoted by $(X_T, Y_T, Z_T)$ a length from the machine control point 24 to the tool tip point 25 is denoted by L, a rotational angle of the B-axis is denoted by $\theta_B$, and a rotational angle of the C-axis is $\theta_C$, the following Equations (1) to (3) are true.

$$X_M = X_T + L \sin\theta_B \cos\theta_C \quad (1)$$

$$Y_M = Y_T + L \sin\theta_B \sin\theta_C \quad (2)$$

$$Z_M = Z_T + L \cos\theta_B \quad (3)$$

In the interval from P2 to P3, the X-coordinate $X_N$ of the machine control point 24 is constant on the limit 27. When an X-coordinate of the limit 27 is denoted by $X_{lim}$, $X_M = X_{lim}$ is satisfied in the interval from P2 to P3. Therefore, $\theta_B$ is obtained by the following Equation (4).

$$\theta_B = \sin^{-1}\left(\frac{X_{lim} - X_T}{L\cos\theta_C}\right) \quad (4)$$

Figure 9:
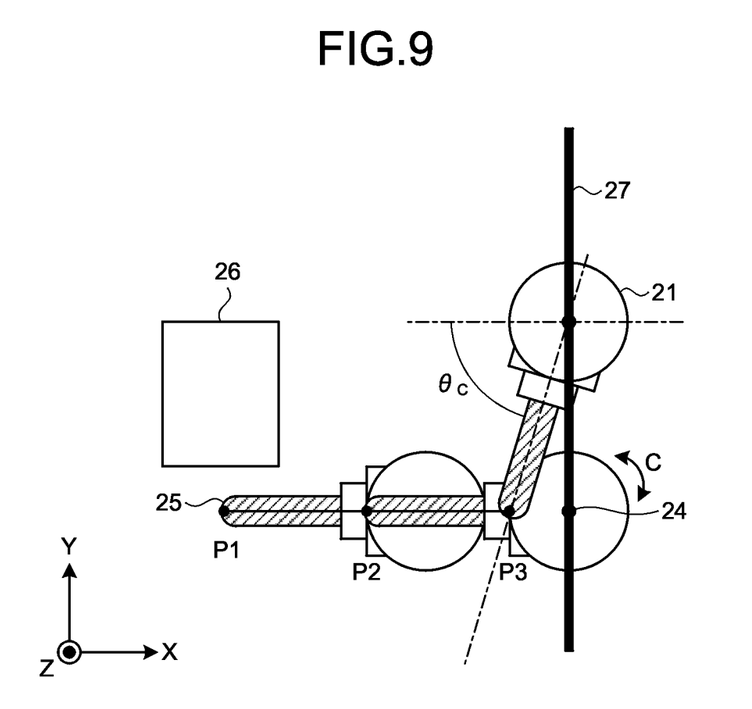
FIG. 9 is an explanatory diagram of an example of an operation for changing a tool posture on an X-Y plane.

FIG. 9 is an explanatory diagram of an example of an operation for changing a tool posture in an X-Y plane. The numerical control device 1 moves the tool tip point 25 while changing the tool posture 17 by driving the tool-side first rotary drive axis 22 (the C-axis) to rotate, in the interval from P2 to P3. The rotational angle $\theta_C$ of the C-axis axis is obtained by the following Equation (5).

$$\theta_C = \cos^{-1}\left(\frac{X_{lim} - X_T}{L\sin\theta_B}\right) \quad (5)$$

As described above, the numerical control device 1 avoids the stroke limit by causing the tool-posture changing unit 7 to change the tool posture 17 by rotating either the tool-side first rotary drive axis 22 or the tool-side second rotary drive axis 23.

In the present embodiment, when the machine control point 24 or the tool tip point 25 is out of the range of the movable region 14, the stroke limit is avoided by automatically changing the tool posture 17 without changing the position of the indicated control point. Corrections for avoiding the stroke limit in the machining program 8 by an operator can be reduced. Effects of making full use of the movable range of the machine tool and improving the work efficiency are thereby achieved.

The numerical control device 1 is not limited to the case of changing the tool posture 17 while setting one of the tool-side first rotary drive axis 22 and the tool-side second rotary drive axis 23 as an object of a rotary drive. Alternatively, the numerical control device 1 may change the tool posture 17 by rotating both the tool-side first rotary drive axis 22 and the tool-side second rotary drive axis 23. Because a plurality of modes are present for changing the tool posture 17, the tool-posture changing unit 7 may determine the mode for changing the tool posture 17 in the following manner.

A first method of determining the mode for changing the tool posture 17 is a method of rotating the rotary drive axis so as to minimize the change of the tool posture 17. The tool-posture changing unit 7 selects the rotational driving that makes the change of the tool posture 17 a minimum change and changes the tool posture 17. The tool-posture changing unit 7 compares a rotational angle of the tool-side first rotary drive axis 22 and a rotational angle of the tool-side second rotary drive axis 23 that are required to avoid the stroke limit with each other, and selects the one having the smaller rotational angle. It is thereby possible to hold the operation of the working machine down to be as small as possible and possible for an operator to work at ease.

Figure 10:
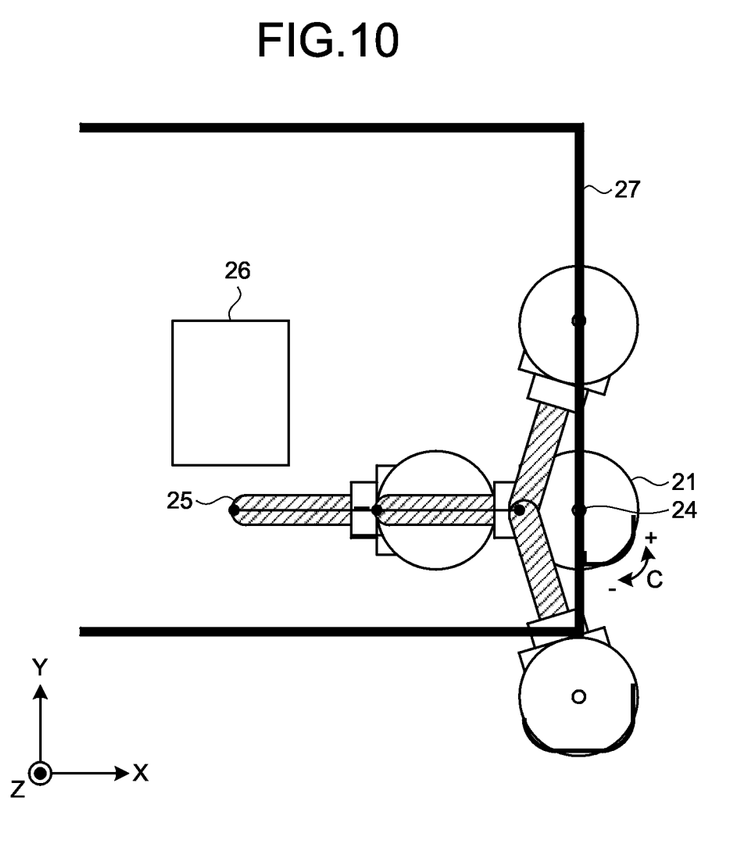
FIG. 10 is an explanatory diagram of an example of an operation for changing a tool posture so as to make movement in a direction in which a movable region is wider.

A second method of determining the mode for changing the tool posture 17 is a method of rotating the rotary drive axis so as to move in a direction in which the movable region 14 is wider. FIG. 10 is an explanatory diagram of an example of an operation for changing the tool posture so as to move in a direction in which the movable region is wider. FIG. 10 exemplifies a case of changing the tool posture 17 by driving the tool-side first rotary drive axis 22 (C-axis) to rotate in the X-Y plane. In this case, whether the C-axis is rotated in a positive direction or a negative direction, it is possible to avoid the stroke limit with respect to the X-axis direction. However, when the C-axis is rotated in the negative direction, it is impossible to avoid the stroke limit with respect to the Y-axis.

The tool-posture changing unit 7 obtains a distance between the limit 27 and the tool 21 for each axis from a position of the limit 27 set in advance and a position of the machine control point 24. The tool-posture changing unit 7 selects, among directions in which the machine control point 24 can be moved, a direction in which the distance between the tool 21 and the limit 27 is the longest, that is, a direction in which it is ensure that the movable region 14 is the widest, as a moving direction, and changes the tool posture 17. In the example shown in FIG. 10, the tool-posture changing unit 7 selects a Y-axis arrow direction in which it is ensured that the movable region 14 is wider, as the moving direction, out of the Y-axis arrow direction and an opposite direction to the Y-axis arrow direction. It is thereby possible to ensure avoiding the stroke limit.

Figure 11:
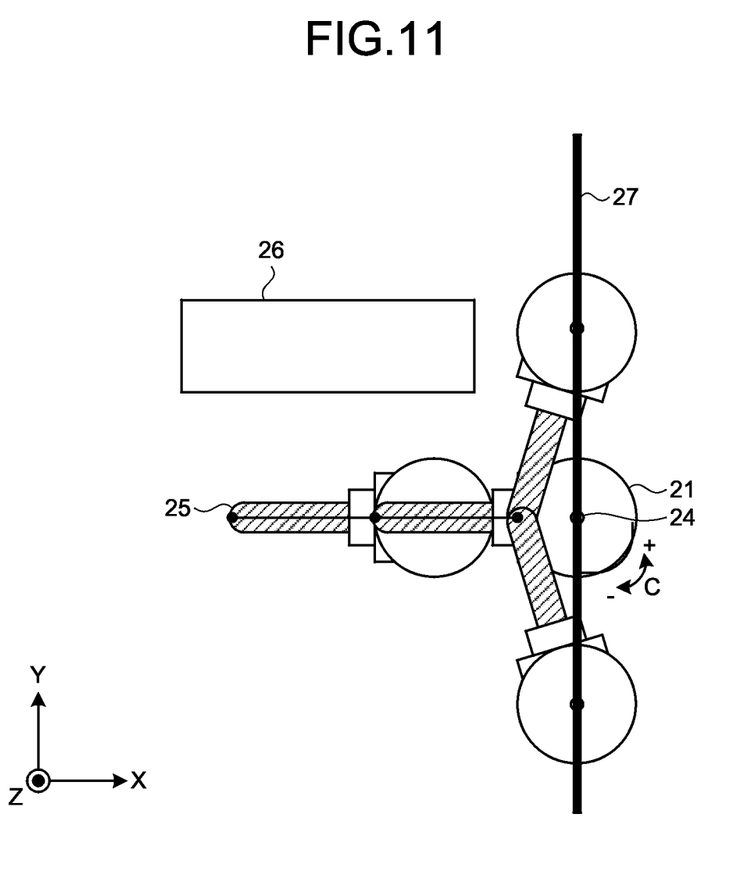
FIG. 11 is an explanatory diagram of an example of an operation for changing a tool posture so as to make movement in a direction away from a workpiece.

A third method of determining the mode for changing the tool posture 17 is a method of rotating the rotary drive axis so as to move in a direction away from the workpiece 26. FIG. 11 is an explanatory diagram of an example of an operation for changing the tool posture so as to move in a direction away from the workpiece. This exemplifies a case of changing the tool posture 17 by way of driving the tool-side first rotary drive axis 22 (C-axis) to rotate in the X-Y plane. In this case, without caring whether the C-axis is rotated in the positive direction or the negative direction, it is possible to avoid the stroke limit with respect to the X-axis direction. However, when the C-axis is rotated in the positive direction, the position of the tool 21 is closer to the workpiece 26, and the risk of interference increases.

The tool-posture changing unit 7 obtains a distance between the workpiece 26 and the tool 21 from a position of the workpiece 26 set in advance and a position of the machine control point 24. The tool-posture changing unit 7 selects, among directions in which the machine control point 24 can be moved, a direction in which the distance between the tool 21 and the workpiece 26 becomes longer, that is, a direction away from the workpiece 26 as a moving direction, and changes the tool posture 17. In the example shown in FIG. 11, the tool-posture changing unit 7 selects, out of the Y-axis arrow direction and the opposite direction thereto, the opposite direction to the Y-axis arrow direction in which the machine control point 24 moves farther from the workpiece 26, as the moving direction. It is thereby possible to suppress the interference between the tool 21 and the workpiece 26.

The numerical control device 1 may be adapted to hold an allowable range of an angle at which the rotary drive axis is rotated so as to change the tool posture 17, as the parameter 10. The tool-posture changing unit 7 changes the tool posture 17 within an allowable range set in advance. It is thereby possible to suppress the operation of the working machine to be as small as possible and an operator can work at ease.

The numerical control device 1 may be adapted to set an allowable range at the time of cutting by the tool 21 and an allowable range at the time of positioning of the tool 21, respectively. In this case, the allowable range at the time of cutting is set smaller than the allowable range at the time of positioning, thereby making it possible to suppress the influence of the change of the tool posture 17 on the actual machining.

Referring back to FIG. 3, when the machine position 12 and the tool tip-point position 13 fall within the range of the movable region 14 (YES at Step S3), the tool-posture changing unit 7 determines whether the tool posture 17 is stored therein (Step S9). When the tool posture 17 is not stored in the tool-posture changing unit 7 (NO at Step S9), the numerical control device 1 ends the process.

When the tool posture 17 is stored in the tool-posture changing unit 7 (YES at Step S9), the tool-posture changing unit 7 determines whether the current tool posture 17 matches the tool posture 17 stored in the tool-posture changing unit 7 (Step S10).

When the current tool posture 17 does not match the tool posture 17 stored in the tool-posture changing unit 7 (NO at Step S10), the tool-posture changing unit 7 restores the tool posture 17 (Step S11), and the numerical control device 1 ends the process. In this way, the tool-posture changing unit 7 restores the tool posture 17 to a state before the change of the posture, after changing the tool posture 17 in response to the tool-posture changing command 16.

When the current tool posture 17 matches the tool posture 17 stored in the tool-posture changing unit 7 (YES at Step S10), the tool-posture changing unit 7 erases the tool posture 17 stored therein (Step S12). As a result, the numerical control device 1 ends the process.

An operation for getting the tool posture 17 back is explained below. Similarly to the case of causing the tool-posture changing unit 7 to change the tool posture 17, the numerical control device 1 restores the tool posture 17 while controlling the control point to move as indicated. For example, in the case of the tool tip-point position control shown in FIG. 8, the numerical control device 1 moves the position of the tool tip point 25 to P3, P2 and P1 in this order.

In the interval from P3 to P2, the numerical control device 1 moves the tool tip point 25 while returning the tool posture 17 to the state before the change of the posture by way of driving the tool-side second rotary drive axis 23 (B-axis) to rotate. The rotational angle $\theta_B$ of the B-axis from P3 to P2 can be obtained using the above Equation (4) similarly to the case of changing the tool posture 17.

As described above, the numerical control device 1 can suppress the influence of the change of the tool posture 17 on the actual machining to its minimum by automatically restoring the changed tool posture 17 to the original state.

When the tool posture 17 still remains changed by the tool-posture changing unit 7, the numerical control device 1 may be adapted to output an alarm when a cutting feed command to feed the tool 21 is issued. By controlling the working machine to stop its operation in response to the output of the alarm, it is possible to suppress the machining with the tool posture 17 remaining changed and to reduce the influence of the change of the tool posture 17 on the machining.

REFERENCE SIGNS LIST

1 numerical control device
2 program analysis unit
3 interpolation unit
4 moving-amount output unit
5 coordinate transformation unit
6 stroke-limit determination unit
7 tool-posture changing unit
8 machining program
9 servo amplifier
10 parameter
11 moving data
12 machine position
13 tool tip-point position
14 movable region
15 stroke limit signal
16 tool-posture changing command
17 tool posture
21 tool
22 tool-side first rotary drive axis
23 tool-side second rotary drive axis
24 machine control point
25 tool tip point
26 workpiece
27 limit

The invention claimed is:

1. A numerical control device for a working machine capable of controlling a posture of a tool relative to a workpiece using rotational driving of a rotary drive axis about a machine control point, the numerical control device comprising:

an interpolation unit configured to perform an interpolation process on moving data generated from a machining program, and output a position of the machine control point for each interpolation point;

a coordinate transformation unit configured to transform the position of the machine control point to a position of a tool tip-point;

a stroke-limit determination unit configured to determine that the position of the machine control point and the tool tip-point position fall outside a range of a movable region of the tool, determine whether the tool posture is changeable based on a comparison between a control point of the tool, which is placed outside the range of the movable region according to a position command, and an object of the position command, output a stroke limit signal indicating a stroke limit in response to the tool posture being unchangeable within the range of the movable region, and output a tool-posture changing command for instructing change of the tool posture in response to the tool posture being changeable within the range of the movable region; and a tool-posture changing unit that changes the tool posture in response to the tool-posture changing command.

2. The numerical control device according to claim 1, wherein the stroke-limit determination unit determines whether the moving data are of a command to indicate the position of the machine control point or a command to indicate the tool tip-point position, and the stroke-limit determination unit outputs the tool-posture changing command when the tool tip-point position is out of the range of the movable region in the case where the moving data are of the command to indicate the position of the machine control point, and when the position of the machine control point is out of the range of the movable region in the case where the moving data are of the command to indicate the tool tip-point position.

3. The numerical control device according to claim 1, wherein the tool-posture changing unit changes the tool posture within an allowable range set in advance.

4. The numerical control device according to claim 1, wherein the tool-posture changing unit selects the rotational driving by which the change of the tool posture is minimized, and accordingly changes the tool posture.

5. The numerical control device according to claim 1, wherein the tool-posture changing unit selects a direction in which it is ensured that the movable region is widest, as a moving direction, among directions in which the machine control point can be moved, and accordingly changes the tool posture.

6. The numerical control device according to claim 1, wherein the tool-posture changing unit selects a direction in which the machine control point moves farther from the workpiece as a moving direction among directions in which the machine control point can be moved, and accordingly changes the tool posture.

7. The numerical control device according to claim 1, wherein
the tool-posture changing unit restores the tool posture to a state before the change of the posture in response to the position of the machine control point and the tool tip-point position falling within the range of the movable region and the tool posture not matching the state before the change of the posture.

8. The numerical control device according to claim 1, wherein an alarm is outputted when a cutting feed command to feed a tool is issued in the case where the tool posture remains changed by the tool-posture changing unit.

9. The numerical control device according to claim 1, wherein the stroke-limit determination unit is further configured to determine that the tool posture is changeable when the machine control point is placed outside the range of the movable region according to the position command and the object of the position command is the tool tip-point.

10. The numerical control device according to claim 1, wherein the stroke-limit determination unit is further configured to determine that the tool posture is changeable when the tool tip-point is placed outside the range of the movable region according to the position command and the object of the position command is the machine control point.

* * * * *